(12) United States Patent
Sandstrom

(10) Patent No.: US 6,834,697 B2
(45) Date of Patent: Dec. 28, 2004

(54) TIRE HAVING SIDEWALL OF RUBBER COMPOSITION CONTAINING FUNCTIONAL LIQUID POLYMER, POLYBUTADIENE, AND BROMINATED COPOLYMER OF ISOBUTYLENE AND PARA-METHYLSTYRENE

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 280 days.

(21) Appl. No.: 10/245,488

(22) Filed: Sep. 17, 2002

(65) Prior Publication Data

US 2004/0050473 A1 Mar. 18, 2004

(51) Int. Cl.$^7$ .............................. B60C 13/00
(52) U.S. Cl. ................ 152/525; 152/524; 525/192; 525/193; 525/333.4
(58) Field of Search ................. 152/523–525, 152/DIG. 12, DIG. 4; 525/191–194, 332.8, 333.1, 333.4

(56) References Cited

U.S. PATENT DOCUMENTS

| | | | |
|---|---|---|---|
| 5,532,312 A | 7/1996 | Gursky et al. | 525/232 |
| 6,255,397 B1 | 7/2001 | Sandstrom | 525/192 |
| 6,374,889 B1 * | 4/2002 | McElrath et al. | 152/525 |

* cited by examiner

*Primary Examiner*—Geoffrey L. Knable
(74) *Attorney, Agent, or Firm*—Henry C. Young, Jr.

(57) ABSTRACT

A tire having a visible sidewall of a rubber composition containing a combination of:

(A) a liquid ethylene/butylene copolymer having a terminal hydroxyl group on one end of the copolymer and either a partially hydrogenated polyisoprene block containing olefinic double bonds, or an epoxidized polyisoprene block containing olefinic double bonds, on the other end of the copolymer, (B) cis 1,4-polybutadiene rubber, (C) a brominated copolymer of isobutylene and para-methylstyrene, and (D) a minor amount of at least one conjugated diene-based rubber, preferably cis 1,4-polyisoprene.

In such manner, it is considered herein that such liquid polymers are functional liquid polymers via the associated terminal hydroxyl group on one end of the copolymer and the modified polyisoprene blocks on the other end. In another aspect, the liquid copolymers are seen herein to act as processing aids for the rubber composition followed by becoming an integral part of the polymer network upon sulfur curing the resulting rubber composition. Therefore, a tire having a sulfur cured, visible sidewall rubber composition is also provided. In a further aspect, the rubber composition may be reinforced with a reinforcing filler as carbon black or as a combination of carbon black and silica together with a coupling agent.

20 Claims, No Drawings

TIRE HAVING SIDEWALL OF RUBBER COMPOSITION CONTAINING FUNCTIONAL LIQUID POLYMER, POLYBUTADIENE, AND BROMINATED COPOLYMER OF ISOBUTYLENE AND PARA-METHYLSTYRENE

FIELD OF THE INVENTION

A tire having a visible sidewall of a rubber composition containing a combination of:

(A) a liquid ethylene/butylene copolymer having a terminal hydroxyl group on one end of the copolymer and either a partially hydrogenated polyisoprene block containing olefinic double bonds, or an epoxidized polyisoprene block containing olefinic double bonds, on the other end of the copolymer, (B) cis 1,4-polybutadiene rubber, (C) a brominated copolymer of isobutylene and para-methylstyrene, and (D) a minor amount of at least one conjugated diene-based rubber, preferably cis 1,4-polyisoprene.

In such manner, it is considered herein that such liquid polymers are functional liquid polymers via the associated terminal hydroxyl group on one end of the copolymer and the modified polyisoprene blocks on the other end. In another aspect, the liquid copolymers are seen herein to act as processing aids for the rubber composition followed by becoming an integral part of the polymer network upon sulfur curing the resulting rubber composition. Therefore, a tire having a sulfur cured, visible sidewall rubber composition is also provided. In a further aspect, the rubber composition may be reinforced with a reinforcing filler as carbon black or as a combination of carbon black and silica together with a coupling agent.

BACKGROUND OF THE INVENTION

Pneumatic tires have sidewalls which are conventionally desired to have good resistance to flex fatigue, scuff resistance and resistance to tear. A suitable visual appearance of the tire sidewall surface may also be a desirable property.

Scuff resistance for a tire sidewall rubber composition is typically enhanced by inclusion of cis 1,4-polybutadiene rubber which is well known to those having skill in such art.

Resistance to flex fatigue for a tire rubber sidewall may sometimes be enhanced by inclusion of an aromatic, naphthenic or parafinnic rubber processing oil in its composition which is also well known by those having skill in such art.

However, while rubber processing oils have been used to improve the processability (e.g. reduced rubber viscosity) of various unvulcanized high viscosity elastomers, as well as improving resistance to flex fatigue of a rubber composition for use as a tire sidewall application, the inclusion of processing oils in such rubber compositions often results in a decrease in various physical properties such as, for example, a vulcanized modulus of elasticity. Accordingly, the use of substantial amounts of processing oils in rubber compounds for a purpose of enhancing their unvulcanized processability, as well as improving resistance to flex fatigue is not necessarily a desirable option.

In one aspect, it has heretofore been proposed to use various diene-based liquid polymers which contain olefinic unsaturation to replace at least a portion of rubber processing oil contained in various rubber compositions. One philosophy has been for the liquid polymer to initially enhance the processability (e.g. reduce rubber viscosity) of a high viscosity unvulcanized rubber composition by reducing its viscosity and to later co-sulfur vulcanize with the elastomer via the olefinic double bonds contained in the liquid polymer upon sulfur vulcanizing the rubber composition.

In another aspect, U.S. Pat. No. 6,255,397 relates to replacement of conventional rubber processing oils with a prescribed hydroxyl terminated liquid polyalkylene-based polymer which reportedly resulted in improved resistance to flex fatigue in the absence of amine-based antioxidants for a sulfur-cured tire sidewall rubber composition which was composed of cis 1,4-polybutadiene, a brominated copolymer of isobutylene and para-methylstyrene and a minor amount of cis 1,4-polyisoprene.

However, it remains desirable to continue to improve various properties for a tire rubber sidewall.

In the description of this invention, the term "phr" as used herein, and according to conventional practice, refers to "parts of a respective material per 100 parts by weight of rubber". The terms "rubber" and "elastomer" can be used interchangeably, unless otherwise indicated. The terms "rubber composition", "compounded rubber" and "rubber compound" can be used interchangeably to refer to "rubber which has been blended or mixed with various ingredients and materials" and the terms "cure" and "vulcanize" may also be used interchangeably herein, unless otherwise indicated and such terms are well known to those having skill in the rubber mixing or rubber compounding art.

SUMMARY AND PRACTICE OF THE INVENTION

In accordance with this invention a tire is provided having a visible sidewall of a rubber composition comprised of, based upon parts by weight per 100 parts by weight rubber (phr):

(A) 100 phr of elastomers comprised of
  (1) about 30 to about 70, alternately about 35 to about 65, phr of cis 1,4-polybutadiene rubber,
  (2) zero to about 30, alternately about 5 to about 25, phr of cis 1,4-polyisoprene rubber, and
  (3) about 30 to about 70, alternately about 40 to about 60, phr of brominated copolymer of isobutylene and p-methylstyrene;

(B) about 2 to about 30, alternately about 5 to about 25, phr of a liquid polyalkylene copolymer selected from:
  (1) a first ethylene/butylene copolymer having a mono-terminal hydroxyl group on one end of the copolymer and an hydrogenated polyisoprene block which contains olefinic double bonds therein on the other end of the copolymer, or
  (2) a second ethylene/butylene copolymer having a mono-terminal hydroxyl group on one end of the copolymer and an epoxidized polyisoprene block on the other end of the copolymer, and (C) about 15 to about 70 phr of reinforcing filler as:
  (1) carbon black, or
  (2) combination of carbon black and synthetic precipitated silica, optionally with a coupling agent having a moiety reactive with hydroxyl groups (e.g. silanol groups) contained on the precipitated silica and another moiety interactive with said conjugated diene-based elastomer(s).

It is a significant aspect of this invention that the rubber composition is suitable for a tire sidewall where high flex endurance properties over a considerable period of time and good resistance to atmospheric ozone degradation without use of amine-based antidegradants in the rubber composition is desired.

In further accordance with this invention, a tire is provided having said visible sidewall rubber composition as a sulfur cured rubber composition. For such tire, the unvulcanized tire assembly, including its sidewall rubber composition, is vulcanized in a suitable mold at an elevated temperature to shape and sulfur-vulcanize the associated rubber compositions of the tire. In such manner, the liquid hydroxyl terminated, saturated ethylene/butylene backbone copolymers having a modified polyisoprene block on the opposite end of the copolymer becomes a part of the sulfur cured network of the sidewall rubber composition in combination with the diene-based rubbers and brominated copolymer of isobutylene and para methylstyrene. Therefore, a tire is provided where said sidewall rubber composition is sulfur vulcanized and said hydroxyl terminated ethylene/butylene backbone copolymer containing said modified polyisoprene block is a part of the sulfur vulcanized rubber network of said sidewall rubber composition.

A significant aspect of this invention is the inclusion of the specified polyalkylene copolymers in a tire sidewall in combination with the cis 1,4-polybutadiene rubber and the brominated copolymer of isobutylene and para-methylstyrene.

Interestingly, it can readily be seen that the liquid copolymers are of a saturated ethylene/butylene backbone containing on one end a mono-hydroxyl terminal group and on the other end of the saturated liquid copolymer backbone is the olefinic (carbon-to-carbon unsaturation) polyisoprene block or the epoxidized polyisoprene block.

In particular, the mono-hydroxyl termination of the copolymers is considered herein to be beneficial in that it might provide compatibility with the diene-based rubbers whereas the ethylene/butylene backbone provides compatibility with the copolymer of isobutylene and para-methylstyrene and the polyisoprene block containing olefinic unsaturation or epoxy groups provides cure compatibility with the cured sulfur network.

And, of course, the use of a liquid copolymer as a processing aid to reduce the rubber viscosity, namely the Mooney (1+4) viscosity, is particularly valuable in order to improve processability of the unvulcanized rubber composition, particularly where relatively high viscosity elastomers are desired, without resorting to utilization of extensive amounts of conventional rubber processing oils.

Thus, a significant aspect of the invention is the reduced use of conventional aromatic, naphthenic or paraffinic rubber processing oils in the sidewall rubber composition.

A significant aspect of the invention is the resultant sidewall rubber composition comprised of such materials which have been observed to exhibit acceptable resistance to flex fatigue property over a considerable period of time as well as acceptable resistance to atmospheric ozone degradation of the rubber composition without requiring an amine-based antioxidant in the rubber composition itself.

In one aspect this is considered herein to be advantageous for a tire sidewall rubber composition in order to improve, or substantially maintain, visible tire sidewall surface appearance after aging while maintaining good durability properties of the sidewall rubber composition itself.

In practice, as hereinbefore pointed out, the sidewall rubber composition may also contain up to about 15, alternately about 2 to about 15, phr of at least one additional diene-based elastomer. Such additional diene-based elastomer may preferably be selected from at least one of organic solvent solution polymerization prepared styrene/butadiene copolymer rubber, aqueous emulsion polymerization prepared styrene/butadiene copolymer rubber, organic solvent polymerization isoprene/butadiene copolymer rubber and styrene/isoprene/butadiene terpolymer rubber. Said additional solvent polymerization prepared rubber may also be a tin coupled elastomer.

In practice, the cis 1,4-polyisoprene rubber for the rubber composition may be natural or synthetic rubber, usually preferably natural rubber.

In practice, it is preferred that the reinforcing filler is carbon black. If desired, silica, particularly precipitated silica which is also intended to include a synthetic precipitated aluminosilicate, (e.g. a synthetic silica precipitated with, or otherwise treated, a very small amount or aluminum) can be present at a level of up to 15 phr (e.g. from about 2 to about 15 phr).

As would be understood by one having skill in such art, a coupling agent would normally be used for said precipitated silica, although the precipitated silica might be used without, and therefore exclusive of, a coupling agent to aid in coupling the precipitated silica to said diene-based elastomers or other ingredients in the rubber composition.

Such coupling agent may be, for example, a bis-(3-triethoxysilylpropyl) polysulfide having an average of from 2 to 2.6 or an average of from 3.5 to 4 connecting sulfur atoms in its polysulfidic bridge. In one aspect of the practice of this invention, such coupling agent is preferably is a bis-(3-triethoxysilylpropyl) polysulfide having an average of from 2 to 2.6 connecting sulfur atoms in its polysulfidic bridge.

The aforesaid first liquid functional copolymer is a liquid polymer having a backbone of an ethylene/butylene copolymer having a terminal mono hydroxyl group on one end of the copolymer and a partially hydrogenated polyisoprene block polymer on the other end of the copolymer. Representative of such functional polymer, a liquid polymer, is Kraton Liquid Polymer L-1302™ from the Shell Chemical Company.

The aforesaid second liquid functional copolymer is a liquid polymer having a backbone of an ethylene/butylene copolymer having a terminal mono hydroxyl group on one end of the copolymer and an epoxidized polyisoprene block polymer on the other end of the copolymer. Representative of such functional polymer, a liquid polymer, is Kraton Liquid Polymer L-207™ from the Shell Chemical Company.

In practice, said liquid functional copolymers may preferably have an equivalent weight range from about 250 to about 70,000, more preferably about 500 to about 7,000, so long as it is liquid at room temperature, (about 23° C.), namely that they are readily pourable at such temperature.

The brominated copolymer of isobutylene and para-alkylstyrene for this application is a copolymer comprised of repeat units derived from isobutylene and para-methylstyrene. Preferably, the copolymer is composed of from about 85 to about 99 weight percent units derived from isobutylene.

In practice, it is considered herein that copolymer is post-brominated and has a resultant bromine content of up to about 5 weight percent and, alternately, from about 0.2 to about 1.5 or even up to 2.5 weight percent in the copolymer.

A preferred copolymer is brominated copolymer of isobutylene and para-methylstyrene as, for example, EXXPRO from the Exxon Chemical Company reportedly having a Mooney Viscosity ML(1–8) at 125° C. of 50+/–10, an isobutylene content of about 94 to 95 weight percent, and a para-methylstyrene content of about 5 percent, with a total bromine content of about 0.8 weight percent. European patent publication No. EP 0.344.021 contains a description of how to make such copolymer. Also, reference may be made to European Patent Publication No. EP 0801105.

The rubber compositions of this invention can be prepared by simply mixing the liquid polyalkylene polymers into the rubber elastomer. This can be done utilizing a wide variety of mixing techniques. In most cases, the mixing will be carried out utilizing an internal rubber mixer or an open roll (e.g. dual opposing rolls) mill mixer. An internal rubber mixer is preferred and it will generally be preferred to mix the liquid polymers into the elastomer composition during the non-productive compounding stage.

It should be noted that the non-productive compounds do not contain curatives, such as sulfur, or accelerators. On the other hand, productive compounds contain a curative which will cure (vulcanize) the rubber after it is heated to a curing temperature.

The rubber compositions of this invention will frequently contain a variety of additional compounding ingredients and/or additives. Typical amounts of processing aids and rubber compounding ingredients comprise about 1 to about 50 phr. Such processing aids can include, for example, aromatic, naphthenic, and/or paraffinic processing oils. Stearic acid is typically referred to as a "rubber compounding ingredient". As purchased, it typically contains primarily stearic acid with small amounts of at least one of oleic acid, linolenic acid and/or palmitic acid. The mixture may also contain small amounts (less than about six weight percent) of myristic acid, arachidic acid and/or arachidonic acid. Such material, or mixture, is conventionally referred to in the rubber compounding art as "stearic acid".

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide, alkyl phenol polysulfides or sulfur olefin adducts. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from 2 to 2.5, being preferred. It is to be appreciated, however, that the cure system, including desired cure package ingredients as well as the following discussion concerning cure accelerators, may vary depending upon the rubber compound ingredients, including the chosen polymers and elastomers.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.8, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Some representative examples of primary accelerators which can be utilized include thiazole accelerators, such as benzothiazyldisulfide and 2-mercaptobenzothiazole; sulfenamide accelerators, such as N-oxydiethylene benzothiazole-2-sulfenamide, N-t-butyl-2-benzothiazolesulfenamide and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate; thiuram accelerators such as dipentamethylene thiuram hexasulfide, tetramethylthiuram monosulfide and tetraethylthiuram monosulfide; and thiourea accelerators, such as trimethyl thiourea and dimethylethyl thiourea. If a second accelerator is used, the secondary accelerator is preferably a guanidine, dithiocarbamate or thiuram compound.

As hereinbefore discussed in an alternative embodiment of this invention, the formulation can additionally contain silica, usually with a silica coupling agent; wherein the amount of particulate silica, namely an amorphous silica, ranges from about zero to about 15, optionally about 2 to about 10 or 15 phr and, wherein the silica coupling agent, if used, is used in an amount wherein the weight ratio of silica coupler to silica may be from about 0.1/1 to about 0.2/1.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

The following examples are used to illustrate the invention. The parts and percentages are by weight unless otherwise indicated.

EXAMPLE I

A series of samples were prepared to evaluate the use of a liquid hydroxyl terminated polyalkylene polymer (ethylene/butylene copolymer backbone) which contains either a partially hydrogenated polyisoprene block containing olefinic double bonds (Kraton L-1303™ liquid polymer) or an epoxidized polyisoprene block, also containing olefinic double bonds, (Kraton L-207™ liquid polymer) on one end of the polymer chain.

These two liquid, hydroxyl terminated, copolymers were evaluated as partial or total replacements for conventional naphthenic/paraffinic rubber processing oil in rubber compositions which contain cis 1,4-polybutadiene rubber, cis 1,4-polyisoprene rubber and a brominated copolymer of isobutylene and para-methylstyrene (which may also contain a minor amount of isoprene).

The samples are referred to herein as Samples A through E, with Sample A being a Control Sample which contained conventional rubber processing oil, whereas Samples B through E contain the above referenced liquid functional terminated copolymers.

In particular, the elastomer based compositions for the Samples are prepared from ingredients presented in the following Table 1. Amounts of conventional rubber processing oil and liquid functional terminated polymers are shown in Table 2 and the corresponding Samples represented as Samples A through E together with various associated physical properties thereof.

The Samples A through E are prepared in a three stage, sequential, mixing process in an internal rubber mixer, namely, a first and second non-productive mixing stage in an internal rubber mixer followed by a productive mixing stage in an internal rubber mixer.

The elastomers, indicated compounding ingredients and liquid polymers are added in the first, non-productive, mixing stage. The second non-productive stage is a re-mixing of the composition formed by mixing the ingredients added in the aforesaid first mixing stage.

In particular, the mixing is conducted in the first stage for about four minutes to a temperature of about 160° C., dumped from the internal rubber mixer, open roll milled for about 30 seconds, sheeted out and allowed to cool to a temperature below 30° C. The resulting rubber composition is then re-mixed in a second mixing stage for about two minutes to a temperature of about 150° C., dumped from the internal rubber mixer, open roll milled for about 30 seconds, sheeted out and allowed to cool to a temperature below 30° C.

In a subsequent mixing stage (a productive mixing stage in an internal rubber mixer), the sulfur curative and accelerator(s) are mixed with the rubber composition and the mixture mixed for about two minutes to a temperature of about 110° C., dumped from the rubber mixer, open roll milled for about 30 seconds, sheeted out, and allowed to cool to a temperature below 30° C.

The various ingredients are shown in the following Table 1.

TABLE 1

| | Parts by Weight |
|---|---|
| First Non-Productive Mix Stage | |
| Natural rubber[1] | 10 |
| Polybutadiene rubber[2] | 50 |
| Brominated copolymer of isobutylene and p-methylstyrene[3] | 40 |
| Carbon black[4] | 40 |
| Tackifier/fatty acid[5] | 11 |
| Naphthenic/paraffinic rubber processing oil[6] | 12, 7 or 0 |
| Liquid polymer A[7] | 0, 5 or 12 |
| Liquid polymer B[8] | 0, 5 or 12 |
| Productive Mix Stage | |
| Zinc oxide | 0.8 |
| Stearic acid | 0.5 |
| Sulfur | 0.4 |
| Accelerators[9] | 1.9 |

[1]Natural cis 1,4-polyisoprene rubber
[2]Cis 1,4-polybutadiene rubber prepared by solution polymerization as BUDENE® 1207 from The Goodyear Tire & Rubber Company
[3]Brominated copolymer of isobutylene and para-methylstyrene obtained as MDX 93-4 ™ from the Exxon Chemical Company
[4]N660 carbon black, an ASTM designation
[5]Phenol-formaldehyde based resin and stearic acid
[6]Naphthenic/paraffinic rubber processing oil as Flexon 641 ™ from the Exxon Company
[7]Liquid polymer as Kraton L1302 ™ from the Shell Chemical Company
[8]Liquid polymer as Kraton L-207 ™ from the Shell Chemical Company
[9]Combination of benzothiazole disulfide (MBTS) and alkyl phenol polysulfide The Samples were prepared from the formulation represented in Table 1 using the "variable" amounts of rubber processing oil, liquid polymer A and liquid polymer B as more fully illustrated shown in Table 2.

The resulting Samples were vulcanized in a suitable mold for about 36 minutes to at a temperature of about 150° C. Various physical properties of the vulcanized Samples are also shown in Table 2.

The stress-strain, hardness and rebound physical properties were determined with a ring tensile specimen on an automated basis via an Automated Testing System instrument (ATS).

TABLE 2

| | Samples | | | | |
|---|---|---|---|---|---|
| | Control A | B | C | D | E |
| Ingredients | | | | | |
| Processing oil | 12 | 7 | 0 | 7 | 0 |
| Liquid polymer A, Kraton L1302 | 0 | 5 | 12 | 0 | 0 |
| Liquid polymer B, Kraton L207 | 0 | 0 | 0 | 5 | 12 |
| Properties Rheometer (150° C.) | | | | | |
| Maximum torque (dNm) | 24.5 | 23.7 | 22 | 23.8 | 22.5 |
| Minimum torque (dNm) | 6.6 | 6.4 | 6.4 | 6.4 | 6.3 |
| Delta torque | 17.9 | 17.3 | 15.6 | 17.7 | 16.2 |
| $T_{90}$, minutes | 24.8 | 23.7 | 23.8 | 24.8 | 25.5 |
| Stress-Strain | | | | | |
| Tensile (MPa) | 8.6 | 9.7 | 9.6 | 9.3 | 10.4 |
| Elongation (%) | 602 | 655 | 651 | 667 | 710 |
| Modulus, 100% (MPa) | 1.3 | 1.3 | 1.3 | 1.3 | 1.3 |
| Modulus, 300% (MPa) | 4.4 | 4.3 | 4.2 | 4.1 | 4.2 |
| Rebound, 100° C. (%) | 67.8 | 66.3 | 62.9 | 64.9 | 61.8 |
| Hardness, Shore A, 100° C. | 43.2 | 42 | 40 | 43 | 41 |
| Tear strength, N, 95° C. | 33 | 42 | 43 | 43 | 42 |
| Ozone, Visual Evaluation | | | | | |
| Static ozone test, 25%[1] | 0 | 0 | 0 | 0 | 0 |
| Kinetic ozone test, 25%[2] | 0 | 0 | 0 | 0 | 0 |
| Cyclic ozone test, days to failure[3] 21 days of testing | 13 | 16 | no failure | no failure | no failure |
| Pierced groove flex test (minutes to 2.54 cm crack)[4] | 6646 | 4668 | 32209 | 23898 | 31705 |
| Rooftop, Kinetic test (days to breaking (365 day maximum) | 61 | 267 | 365 | 266 | 276 |

[1]Static ozone test of the cured Samples, of a size of about 15.2 cm by 1.3 cm, in an enclosed container in an atmosphere which contains 50 pphm (parts per 100 million gaseous concentration) at about 23° C. and 25 percent strain (25% elongation) for about 48 hours. A visual rating of zero indicates no cracking of the sample.
[2]The Kinetic test is conducted in a manner similar to the above Static test except that the Samples are dynamically continuously flexed, without relaxation, during the test. A visual inspection of the resulting Samples indicated no cracks and therefore a rating of zero was given.
[3]The Cyclic test is conducted in a manner similar to the above Static test except that Samples undergo a series of continuous cycles of dynamic flexing and relaxing during the test. Samples A and B failed after the recited number of days. Sample C, D and E did not fail after 21 days of testing and showed no surface cracks.
[4]The Rooftop test of the cured samples (Sample size is 15.2 by 1.3 cm) is conducted by exposing the Samples to atmospheric conditions on a testing apparatus located on a rooftop which continuously dynamically flexes the Samples, without relaxation, until failure or for about 365 days, whichever first occurs.
[5]Pierced Groove Flex test is a measure of crack growth during dynamic continuous flexing without relaxation of the Sample and is express herein as the time in minutes to reach a crack growth of 2.54 cm (or one inch), wherein a higher value is considered as being better.

From Table 2 it can be seen that the static and ozone test Samples showed no evidence of ozone cracking for all of the Samples A through E.

The cyclic test results, show superior or longer times to break for the experimental Samples B through E as compared to the Control Sample A. The rooftop test samples show more days to break for the experimental Samples B through E as compared to the Control Sample A. The Pierced Groove Flex test results show the superiority of experimental Samples C, D and E as compared to Control Sample A and experimental Sample B.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a visible sidewall of a rubber composition comprised of, based upon parts by weight per 100 parts by weight rubber (phr):
   (A) 100 phr of elastomers comprised of
      (1) about 30 to about 70, alternately about 35 to about 65, phr of cis 1,4-polybutadiene rubber,
      (2) zero to about 30, alternately about 5 to about 25, phr of cis 1,4-polyisoprene rubber, and
      (3) about 30 to about 70, alternately about 40 to about 60, phr of brominated copolymer of isobutylene and p-methylstyrene;
   (B) about 2 to about 30, alternately about 5 to about 25, phr of a liquid polyalkylene copolymer selected from:
      (1) a first ethylene/butylene copolymer having a mono-terminal hydroxyl group on one end of the copolymer and an hydrogenated polyisoprene block which contains olefinic double bonds therein on the other end of the copolymer, or
      (2) a second ethylene/butylene copolymer having a mono-terminal hydroxyl group on one end of the copolymer and an epoxidized polyisoprene block on the other end of the copolymer, and
   (C) about 15 to about 70 phr of reinforcing filler as:
      (1) carbon black, or
      (2) combination of carbon black and synthetic precipitated silica, optionally with a coupling agent having a moiety reactive with hydroxyl groups contained on the precipitated silica and another moiety interactive with said diene-based elastomer(s).

2. The tire of claim 1 wherein said sidewall rubber composition is sulfur vulcanized and said hydroxyl terminated ethylene/butylene backbone copolymer is a part of the sulfur vulcanized rubber network of said sidewall rubber composition.

3. The tire of claim 2 wherein said cis 1,4-polyisoprene is natural rubber.

4. The tire of claim 2 wherein said sidewall rubber composition contains from about 2 to about 15 phr of at least one additional diene-based elastomer selected from organic solvent polymerization prepared styrene/butadiene copolymer rubber, aqueous emulsion polymerization prepared styrene/butadiene copolymer rubber, organic solvent polymerization prepared isoprene/butadiene copolymer rubber and styrene/isoprene/butadiene terpolymer.

5. The tire of claim 4 wherein said additional solvent polymerization prepared elastomer is a tin coupled elastomer.

6. The tire of claim 2 wherein said brominated copolymer is comprised of about 85 to about 99 weight percent units derived from isobutylene.

7. The tire of claim 2 wherein said reinforcing filler is carbon black.

8. The tire of claim 2 wherein said reinforcing filler is carbon black and precipitated silica; wherein said precipitated silica is present in an amount of from 2 to about 15 phr and is exclusive of silica coupling agent.

9. The tire of claim 2 wherein said reinforcing filler is carbon black and precipitated silica; wherein said precipitated silica is present in an amount of from 2 to about 15 phr and said rubber composition contains a silica coupling agent having a moiety reactive with hydroxyl groups on the surface of said precipitated silica and another moiety interactive with said diene-based elastomer(s).

10. The tire of claim 9 wherein said coupling agent is a bis (3-triethoxysilylpropyl) polysulfide having an average of from 2 to 2.6 or an average of from 3.5 to 4 connecting sulfur atoms in its polysulfidic bridge.

11. The tire of claim 1 wherein said liquid polyalkylene copolymer is said first ethylene/butylene copolymer and wherein said liquid copolymer has an equivalent weight range from about 250 to about 70,000, so long as it is pourable at 23° C.

12. The tire of claim 1 wherein said liquid polyalkylene copolymer is said second ethylene/butylene copolymer and wherein said liquid copolymer has an equivalent weight range from about 250 to about 70,000, so long as it is pourable at 23° C.

13. The tire of claim 2 wherein said liquid polyalkylene copolymer is said first ethylene/butylene copolymer.

14. The tire of claim 2 wherein said liquid polyalkylene copolymer is said second ethylene/butylene copolymer.

15. The tire of claim 1 wherein said sidewall rubber composition is comprised of, based upon parts by weight per 100 parts by weight rubber (phr):
   (A) 100 phr of elastomers comprised of
      (1) about 35 to about 65 phr of cis 1,4-polybutadiene rubber,
      (2) about 5 to about 25 phr of cis 1,4-polyisoprene rubber, and
      (3) about 40 to about 60 phr of brominated copolymer of isobutylene and p-methylstyrene;
   (B) about 5 to about 25 phr of a liquid polyalkylene copolymer selected from:
      (1) a first ethylene/butylene copolymer having a mono-terminal hydroxyl group on one end of the copolymer and an hydrogenated polyisoprene block which contains olefinic double bonds therein on the other end of the copolymer, or
      (2) a second ethylene/butylene copolymer having a mono-terminal hydroxyl group on one end of the copolymer and an epoxidized polyisoprene block on the other end of the copolymer, and
   (C) about 15 to about 70 phr of reinforcing filler as:
      (1) carbon black, or
      (2) combination of carbon black and synthetic precipitated silica, optionally with a coupling agent having a moiety reactive with hydroxyl groups contained on the precipitated silica and another moiety interactive with said diene-based elastomer(s).

16. The tire of claim 15 wherein said sidewall rubber composition is sulfur vulcanized and said hydroxyl terminated ethylene/butylene backbone copolymer is a part of the sulfur vulcanized rubber network of said sidewall rubber composition.

17. The tire of claim 16 wherein said reinforcing filler is carbon black.

18. The tire of claim 16 wherein said reinforcing filler is carbon black and precipitated silica; wherein said precipitated silica is present in an amount of from 2 to about 15 phr and said rubber composition contains a silica coupling agent as a bis (3-triethoxysilylpropyl) polysulfide having an average of from 2 to 2.6 or an average of from 3.5 to 4 connecting sulfur atoms in its polysulfidic bridge.

19. The tire of claim 16 wherein said liquid polyalkylene copolymer is said first ethylene/butylene copolymer.

20. The tire of claim 16 wherein said liquid polyalkylene copolymer is said second ethylene/butylene copolymer.

* * * * *